United States Patent
Akisada et al.

(10) Patent No.: US 12,386,339 B2
(45) Date of Patent: Aug. 12, 2025

(54) APPARATUS, SYSTEM, METHOD, AND NON-TRANSITORY COMPUTER-READABLE MEDIUM FOR ACQUIRING MEASUREMENT DATA RELATED TO A TARGET DEVICE THAT A USER IS LOOKING AT

(71) Applicant: Yokogawa Electric Corporation, Tokyo (JP)

(72) Inventors: Yukiyo Akisada, Tokyo (JP); Yasuki Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 310 days.

(21) Appl. No.: 17/918,327

(22) PCT Filed: May 14, 2021

(86) PCT No.: PCT/JP2021/018357
§ 371 (c)(1),
(2) Date: Oct. 12, 2022

(87) PCT Pub. No.: WO2022/018941
PCT Pub. Date: Jan. 27, 2022

(65) Prior Publication Data
US 2023/0138872 A1    May 4, 2023

(30) Foreign Application Priority Data
Jul. 22, 2020  (JP) .................... 2020-125522

(51) Int. Cl.
*G05B 19/418*  (2006.01)
*G01D 21/02*  (2006.01)
*G01D 9/00*  (2006.01)

(52) U.S. Cl.
CPC ......... *G05B 19/4183* (2013.01); *G01D 21/02* (2013.01); *G05B 19/41855* (2013.01); *G01D 9/005* (2013.01); *G05B 2219/21031* (2013.01)

(58) Field of Classification Search
USPC ........................................ 702/187
See application file for complete search history.

(56) References Cited

U.S. PATENT DOCUMENTS

2011/0055481 A1* 3/2011 Murakami .......... G06F 12/0875
                                                        711/E12.001
2014/0168056 A1    6/2014 Swaminathan
(Continued)

FOREIGN PATENT DOCUMENTS

JP    2014164482 A    9/2014
JP    2016509705 A    3/2016
(Continued)

OTHER PUBLICATIONS

Office Action issued for counterpart Japanese Application No. 2020-125522, issued by the Japanese Patent Office on Oct. 18, 2022 (drafted on Oct. 13, 2022).
(Continued)

*Primary Examiner* — Paul D Lee

(57) ABSTRACT

There is provided an apparatus including a storage unit configured to store, in association with each of a plurality of devices existing in a plant, a storage address of measurement data which is related; a detection unit configured to detect, among the plurality of devices, a target device that a user is looking at; an acquisition unit configured to acquire, from the storage address associated with the target device, measurement data related to the target device; and a display unit configured to display a content acquired by the acquisition unit.

20 Claims, 5 Drawing Sheets

(56) References Cited

U.S. PATENT DOCUMENTS

| | | |
|---|---|---|
| 2014/0240484 A1 | 8/2014 | Kodama |
| 2018/0130260 A1 | 5/2018 | Schmirler |
| 2020/0090424 A1* | 3/2020 | Honda ................... G08C 15/00 |
| 2021/0035535 A1 | 2/2021 | Kanda |

FOREIGN PATENT DOCUMENTS

| | | |
|---|---|---|
| JP | 2016177565 A | 10/2016 |
| JP | 2017199954 A | 11/2017 |
| WO | 2019155876 A1 | 8/2019 |

OTHER PUBLICATIONS

Extended European Search Report for counterpart European Application No. 21845329.8, issued by the European Patent Office on Jul. 23, 2024.

* cited by examiner

APPARATUS, SYSTEM, METHOD, AND NON-TRANSITORY COMPUTER-READABLE MEDIUM FOR ACQUIRING MEASUREMENT DATA RELATED TO A TARGET DEVICE THAT A USER IS LOOKING AT

BACKGROUND

1. Technical Field

The present invention relates to an apparatus, a system, a method, and a computer-readable medium.

2. Related Art

Patent Document 1 discloses that "a line of sight of a user is detected to control information communication with another communication device".

Patent Document 1: Japanese Patent Application Publication No. 2016-177565

GENERAL DISCLOSURE

A first aspect of the present invention provides an apparatus. The apparatus may include a storage unit configured to store, in association with each of a plurality of devices existing in a plant, a storage address of measurement data which is related. The apparatus may include a detection unit configured to detect, among the plurality of devices, a target device that a user is looking at. The apparatus may include an acquisition unit configured to acquire, from the storage address associated with the target device, measurement data related to the target device. The apparatus may include a display unit configured to display a content acquired by the acquisition unit.

A second aspect of the present invention provides a system. The system may include the apparatus according to the first aspect. The system may include at least one storage device configured to store, in association with each of at least some devices among the plurality of devices, measurement data related to the each of the at least some devices.

A third aspect of the present invention provides a method. The method may include storing, in association with each of a plurality of devices existing in a plant, a storage address of measurement data which is related. The method may include detecting, among the plurality of devices, a target device that a user is looking at. The method may include acquiring, from the storage address associated with the target device, measurement data related to the target device. The method may include displaying a content acquired by the acquiring.

A fourth aspect of the present invention provides a computer-readable medium having recorded thereon a program. The program may cause a computer to function as a storage unit configured to store, in association with each of a plurality of devices existing in a plant, a storage address of measurement data which is related. The program may cause the computer to function as a detection unit configured to detect, among the plurality of devices, a target device that a user is looking at. The program may cause the computer to function as an acquisition unit configured to acquire, from the storage address associated with the target device, measurement data related to the target device. The program may cause the computer to function as a display unit configured to display a content acquired by the acquisition unit.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

1. Configuration of Maintenance and Management System 1

Figure 1:
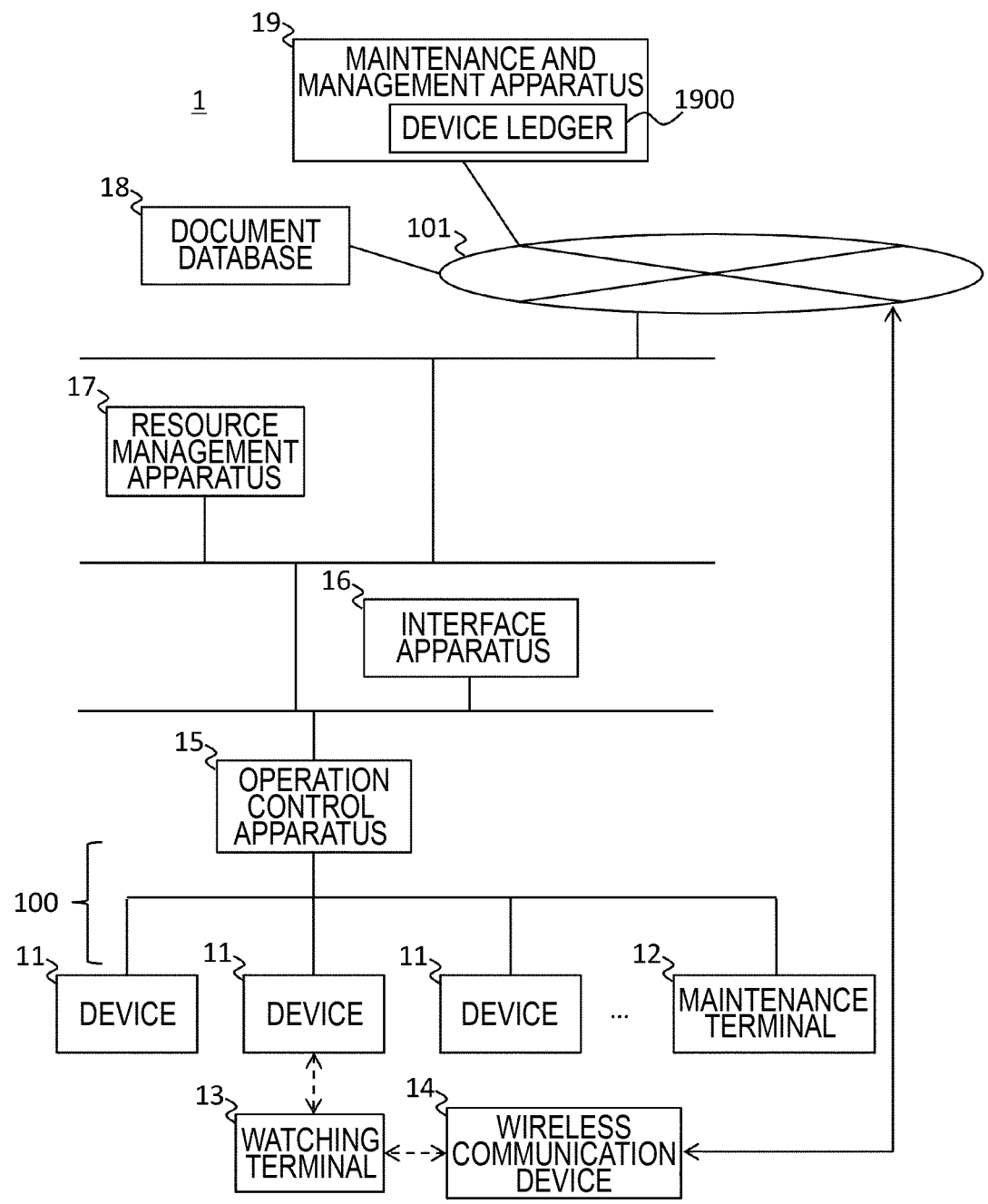
FIG. 1 shows a maintenance and management system 1 according to the present embodiment.

FIG. 1 shows a maintenance and management system 1 according to the present embodiment. The maintenance and management system 1 performs maintenance and management of a plant, and includes a plurality of devices 11, a maintenance terminal 12, a watching terminal 13, one or more wireless communication devices 14, and an operation control apparatus 15, an interface apparatus 16, a resource management apparatus 17, one or more document databases 18, and a maintenance and management apparatus 19.

Here, examples of the plant include: in addition to an industrial plant such as a chemical plant, a plant for managing and controlling a well site such as a gas field or an oil field and its surrounding area; a plant for managing and controlling power generation such as hydroelectric, thermal, or nuclear power generation; a plant for managing and controlling energy harvesting from solar power, wind power, or the like; a plant for managing and controlling water and sewerage, dams, or the like; and others. Each device 11, the maintenance terminal 12, a watching terminal 13, and the wireless communication device 14 may be arranged at a field site where a process is executed in the plant. For example, at the field site, there exist a pipe through which a fluid to be measured is caused to flow, a flow meter which is installed in the pipe to measure a flow rate of the fluid, and the like. In addition, the operation control apparatus 15, the interface apparatus 16, and the resource management apparatus 17 may be arranged in a management room, an instrument room, or the like in the plant. The document database 18 may be arranged outside the plant. The maintenance and management apparatus 19 may be arranged in the management room, the instrument room, or the like in the plant, or may be arranged outside the plant.

1-1. Device 11

Each of the plurality of devices 11 is a tool, a machine, or an apparatus, and for example, may be: a sensor that measures a physical quantity such as a pressure, a temperature, a pH, a speed, and a flow rate in the process in the plant; may be an actuator such as a valve which controls any of physical quantities, a flow control valve, an opening and closing valve, a pump, a fan, a motor, a heating apparatus, or a cooling apparatus; may be an acoustic device such as a microphone or a speaker that collects an abnormal noise or the like in the plant or emits a warning sound or the like; may be a location detection device that outputs location information of each device; may be a pipe through which a fluid is caused to flow; or may be another device. Each device 11 among the plurality of devices 11 may be a different type, or two or more of at least some devices 11 may be the same type.

Each device 11 may be connected to the operation control apparatus 15 via a control network 100 in a wired or wireless manner. A communication in the control network 100 may a be digital communication, may be a hybrid communication in which a digital signal is superimposed on an analog signal (a signal at 4 to 20 mA or the like), or may be at a speed of approximately 1000 bps to 10000 bps (as an example, 1200 bps, 2400 bps). The communication in the control network 100 may be performed, for example, by a wireless communication protocol of ISA (International Society of Automation), and may be performed, as an example, by ISA100, HART (Highway Addressable Remote Transducer) (registered trademark), BRAIN (registered trademark), FOUNDATION Fieldbus, PROFIBUS, or the like.

In addition, at least some devices 11 may wirelessly communicate with at least one of the wireless communication device 14 or the watching terminal 13 in accordance with a standard of IEEE802.11 (so-called Wifi (registered trademark)) or a standard of IEEE802.15.1 (so-called Bluetooth (registered trademark)).

Each device 11 may have specific identification information (also referred to as device specific information). The device specific information is information for uniquely identifying the device, and may be, as an example in the present embodiment, at least one of a serial number assigned to the device 11 by a communication protocol (the HART as an example), a serial number set by a manufacturer of the device 11, or a device ID.

In addition, in the one or more devices 11, a value of at least one parameter (also referred to as a value of a configuration parameter) may be able to be set. The configuration parameter may be any parameter. As an example, the configuration parameter may be an adjustment amount for performing a zero point adjustment, may indicate a time constant, may indicate whether an initialization is necessary or unnecessary, may indicate a test condition, or may indicate the identification information or a tag name of the device 11. The value of the configuration parameter may be stored in an internal storage device (not shown) of the device 11.

In addition, at least some devices 11 may each store measurement data related to the at least some devices 11 in the internal storage device.

1-1.1. Measurement Data

Measurement Data (1)

A plurality of pieces of measurement data related to the plurality of devices 11 may include the measurement data obtained by the sensor as the device 11.

For example, when the device 11 is the sensor that measures the physical quantity such as a pressure, a temperature, a pH, a speed, and a flow rate, the measurement data may be data indicating these physical quantities.

Measurement Data (2)

The plurality of pieces of measurement data related to the plurality of devices 11 may include the measurement data obtained by the sensor that is provided in the device 11, or the sensor that is provided in an accessory of the device 11.

For example, when the device 11 is the actuator, and sensors are provided in the device 11 itself or the accessory of the device 11, the measurement data may be data measured by these sensors. As an example, when the device 11 is the actuator of a valve, a flow control valve, an opening and closing valve, a pump, a fan, a motor, or the like, the measurement data may be data indicating the physical quantity such as a speed, a flow rate, a pressure, a temperature, and a pH of a fluid which are controlled by the device 11. When the device 11 is the actuator of a heating apparatus, a cooling apparatus, or the like, the measurement data may be data indicating the physical quantity such as a temperature of a target which is heated or cooled by the device 11.

In addition, when the device 11 is the pipe, and sensors are provided in the device 11 itself or the accessory of the device 11, the measurement data may be data measured by these sensors. As an example, the measurement data may be data indicating the physical quantity such as a speed, a flow rate, a pressure, a temperature, and a pH of the fluid flowing through the pipe as the device 11.

It should be noted that as the sensor provided in the device 11, or the sensor provided in the accessory of the device 11, the sensor itself may be the device 11. In this case, the measurement data obtained by the sensor is measurement data related to the device 11 as the sensor, or may be measurement data related to the device 11 provided with the sensor (or the device 11 provided with the sensor in the accessory).

In addition, the accessory of the device 11 may be an article with a body different from a main body of the device 11. For example, the accessory of the device 11 may be a pipe provided with the device 11, a wall into which the device 11 is fitted, a cover of the device 11, or the like.

Measurement Data (3)

The plurality of pieces of measurement data related to the plurality of devices 11 may include the measurement data obtained by the sensor which is provided in an accessory on an upstream side or a downstream side with respect to the pipe as the device 11. The accessory on the upstream side or the downstream side with respect to the pipe may be the pipe on the upstream side or the downstream side from the pipe, or may be the actuator of a flow control valve, an opening and closing valve, a pump, a fan, a motor, or the like, which is provided on the upstream side or the downstream side from the pipe. As an example, the measurement data may be data indicating the physical quantity such as a speed, a flow rate, a pressure, a temperature, and a pH of the fluid on the upstream side or the downstream side from the pipe as the device 11.

1-2. Maintenance Terminal 12

The maintenance terminal 12 accesses the configuration parameter of device 11 to refer to, set, and change the value of the configuration parameter, or the like. The maintenance terminal 12 may be a handheld terminal (HHT) (as an example, a smartphone or a tablet PC) carried by a field site worker, or may be a stationary PC. When the maintenance terminal 12 is a handheld terminal, the maintenance terminal 12 may be detachably connected to the device 11. It should be noted that in addition to the configuration parameter being changed by using the maintenance terminal 12, the device 11 may be attached to and detached from the control network 100 by a field site worker, and an operation may also be stopped for maintenance.

1-3. Watching Terminal 13

The watching terminal 13 is an example of the apparatus, and is carried by a user (a watcher as an example) who watches an inside of the plant.

The watching terminal 13 may wirelessly communicate with the one or more devices 11. In addition to or instead of this, the watching terminal 13 may wirelessly communicate, via the wireless communication device 14, with at least one of the one or more devices 11, the operation control apparatus 15, the interface apparatus 16, or the resource management apparatus 17. The wireless communication by the watching terminal 13 may be in accordance with at least one standard of the Wifi (registered trademark) or the Bluetooth (registered trademark).

The watching terminal 13 may display information related to the device 11. It should be noted that the details of the watching terminal 13 will be described below.

1-4. Wireless Communication Device 14

Each wireless communication device 14 is provided outside the watching terminal 13 to wirelessly communicate with the watching terminal 13. Each wireless communication device 14 may communicate, in a wired or wireless manner, with at least one of the one or more devices 11, the operation control apparatus 15, the interface apparatus 16, or the resource management apparatus 17. For example, the wireless communication device 14 may communicate, via a network 101, with the operation control apparatus 15, the interface apparatus 16, or the resource management apparatus 17.

1-5. Operation Control Apparatus 15

The operation control apparatus 15 communicates with each device 11 to control the process. For example, the operation control apparatus 15 acquires a process value, which is measurement data, from the device 11 which is the sensor, and drives the device 11 which is the actuator. The operation control apparatus 15 may be an example of the storage device, and may store, in association with at least some devices 11, the measurement data related to the at least some devices 11. Then, the operation control apparatus 15 may supply the process value to the interface apparatus 16, and receive a target value of the process value from the interface apparatus 16. It should be noted that as an example, in the present embodiment, a description is made that the maintenance and management system 1 is provided with one operation control apparatus 15 to control all of the devices 11; however, a plurality of operation control apparatuses 15 may be provided to respectively perform distributed controls on some of the devices 11. The operation control apparatus 15 may be an FCS (Field Control Station) as an example.

1-6. Interface Apparatus 16

The interface apparatus 16 interfaces between a manager and the plant. The interface apparatus 16 may control the process of the plant via the operation control apparatus 15 according to the operation by the manager. For example, the interface apparatus 16 may receive the process value from the operation control apparatus 15, and supply the target value of the process value to the operation control apparatus 15. In addition, the interface apparatus 16 may change the value of the configuration parameter of the device 11 via the operation control apparatus 15. The interface apparatus 16 may be an example of the storage device, and may store, in association with at least some devices 11, the measurement data related to the at least some devices 11. In addition, the interface apparatus 16 may store, in association with at least some devices 11, the value of the configuration parameter of each of the at least some devices 11. The interface apparatus 16 may be a HIS (Human Interface Station) as an example, or may be constituted by a PC or the like.

1-7. Resource Management Apparatus 17

The resource management apparatus 17 performs online monitoring and centralized management of the plant. For example, the resource management apparatus 17 may manage information or the like (as an example, the value of the configuration parameter or the process value) of the device 11, which is acquired by the operation control apparatus 15. The resource management apparatus 17 may be an example of the storage device, and may store, in association with at least some devices 11, the measurement data related to the at least some devices 11. In addition, the resource management apparatus 17 may store, in association with at least some devices 11, the value of the configuration parameter of each of the at least some devices 11. The resource management apparatus 17 may be, as an example, constituted by a PC or the like.

1-8. Document Database 18

Each document database 18 stores a model name of the device 11 and a digitized document related to the device 11 in association with each other. The document may be a text file of a specification sheet, a manual, an inspection report, or the like of the device 11, or may be an image file. The document database 18 may be installed by the manufacturer of the device 11 as an example. It should be noted that the document database 18 and the maintenance and management apparatus 19 may be connected to the resource management apparatus 17 or the like via the network 101 (as an example, the Internet or a dedicated line).

1-9. Maintenance and Management Apparatus 19

The maintenance and management apparatus 19 supports maintenance and management of equipment. The maintenance and management apparatus 19 may have a device ledger 1900 that stores at least the device specific information and the value of the configuration parameter for each of the plurality of devices 11. The device ledger 1900 may include a relationship diagram showing, for each device 11 existing in the plant, a relationship between the device 11 and another device 11.

The relationship diagram may be a piping diagram, or may be a design diagram of the plant. Note that the relationship diagram may be any other diagram.

As an example, the maintenance and management apparatus 19 may be a Device Lifecycle Manager, may be realized by cloud computing, or may be realized by a physical server or a PC. The maintenance and management apparatus 19 may be connected to the resource management apparatus 17 or the like via the network 101 in a wired or wireless manner.

2. Watching Terminal 13

Figure 2:
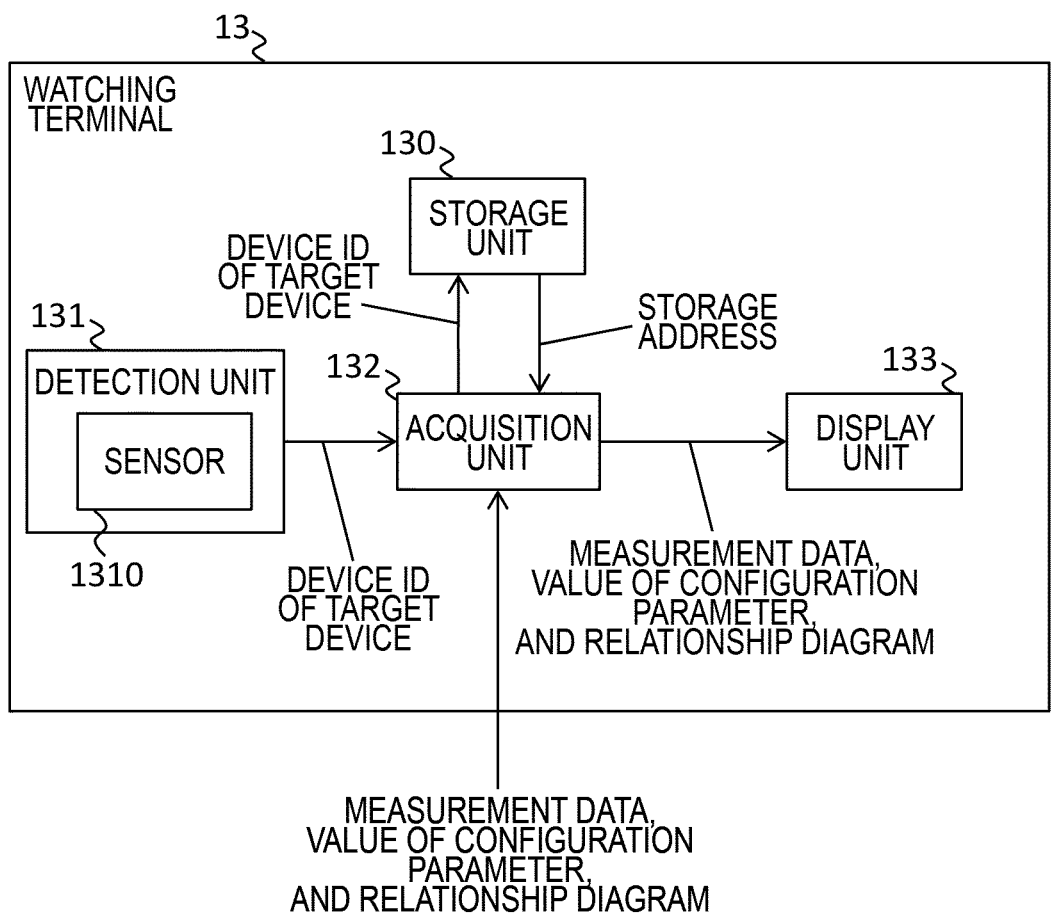
FIG. 2 shows a watching terminal 13.

FIG. 2 shows a watching terminal 13. The watching terminal 13 has a storage unit 130, a detection unit 131, an acquisition unit 132, and a display unit 133.

2.1. Storage Unit 130

The storage unit 130 is configured to store, in association with each of the plurality of devices 11 existing in the plant, a storage address of the measurement data which is related or the like. In the present embodiment, as an example, the storage unit 130 may store the storage address in association with the device specific information of the device 11.

The storage unit 130 may respectively store, in association with each of the at least one device 11 among the plurality of devices 11 existing in the plant, storage addresses of a plurality of types of measurement data. For example, when a plurality of sensors are provided in at least one of the device 11 or the accessory thereof, the storage unit 130 may store, in association with the device 11, each of the storage addresses of the measurement data obtained by the plurality of sensors. The plurality of types of measurement data may be measurement data obtained by the sensors different from each other, may be data indicating types of physical quantities different from each other among the physical quantities such as a speed, a flow rate, a pressure, a temperature, and a pH, or may be data indicating the same type of physical quantities at measurement locations different from each other.

Here, the measurement data related to at least some devices 11 among the plurality of devices 11 existing in the plant may be stored in an external storage device of the at least some devices 11 (in the present embodiment, as an example, the operation control apparatus 15, the interface apparatus 16, or the resource management apparatus 17). In this case, the storage unit 130 may store, in association with each of these at least some devices 11, an address which is in the external storage device of the device 11, as the storage address of the measurement data. In addition, when the measurement data is stored in the external storage device of the device 11, the measurement data related to the two or more devices 11 may be stored in a single external storage device of the device 11. In this case, the storage unit 130 may respectively store, in association with each of the two or more devices 11, addresses which are in the storage device and different from each other, as the storage addresses of the measurement data.

In addition, the measurement data related to at least some other devices 11 among the plurality of devices 11 existing in the plant may be stored in the internal storage device of each of the at least some other devices 11. In this case, the storage unit 130 may store, in association with each of these at least some other devices 11, the address which is in the internal storage device of each of the at least some other devices 11, as the storage address of the measurement data. The device 11 in which the measurement data is stored in the internal storage device may be the device 11 different from the above-mentioned device 11 in which the measurement data is stored in the external storage device.

It should be noted that when the plurality of types of measurement data are stored for the device 11, each of these plurality of types of measurement data may be stored in the internal storage device of the device 11, or may be stored in the external storage device of the device 11. Instead of this, among the plurality of types of measurement data, some types of measurement data may be stored in the internal storage device of the device 11, and remaining types of measurement data may be stored in the external storage device of the device 11. In this case, the storage unit 130 may store, in association with the device 11, each of the address which is in the internal storage device of the device 11, and the address which is in the external storage device of the device 11, as the storage addresses of the measurement data.

2.1.1. Storage Other than Measurement Data

The storage unit 130 may further store, in association with each of the one or more devices 11 in which the value of the configuration parameter is able to be set, the storage address of the value of the configuration parameter of each of the one or more devices 11. The storage address of the configuration parameter may be the same as or different from the storage address of the measurement data.

The storage unit 130 may store, as the storage address of the configuration parameter, the address which is in the internal storage device of the device 11, or may store, as the storage address of the configuration parameter, the address which is in the external storage device of the device 11. The external storage device of the device 11 may be the maintenance and management apparatus 19, may be the maintenance terminal 12, or may be the resource management apparatus 17. When the operation control apparatus 15 or the interface apparatus 16 stores the value of the configuration parameter, the external storage device of the device 11 may be these apparatuses.

The storage unit 130 may further store the storage address of the relationship diagram (for example, the piping diagram or the design diagram) showing, for each device 11 existing in the plant, the relationship between the device 11 and the other device 11. In the present embodiment, as an example, the storage unit 130 may store, as the storage address of the relationship diagram, the address which is in the maintenance and management apparatus 19.

2.2. Detection Unit 131

The detection unit 131 is configured to detect, among the plurality of devices 11, the target device 11 that the user is looking at.

The detection unit 131 may have one or more sensors 1310. For example, the detection unit 131 may have at least one of a six axis sensor, a magnetic sensor, or a positioning sensor as the one or more sensors 1310.

The six axis sensor may be a motion sensor (also referred to as an inertial sensor) having a three axis acceleration sensor and a three axis gyro (angular velocity) sensor, and may detect a movement of a head of the user, and further an orientation of the watching terminal 13. The magnetic sensor may be, for example, a three axis geomagnetic sensor. The positioning sensor may receive a wireless signal which is transmitted from a GPS satellite, and detect coordinates of a current location of the watching terminal 13.

The detection unit 131 may detect a location of the user in the plant, and a line of sight or a point of gaze (also referred to as a position of gaze) of both eyes based on signals from these sensors. The line of sight of the user may be a straight line connecting a midpoint of both eyes, and the point of gaze of the user.

The detection unit 131 may detect the target device 11 by referring to a database (not shown) in which the location coordinates of each device 11 in the plant are registered in advance. For example, the detection unit 131 may refer to the database and detect, as the target device 11, the device 11 located on the line of sight starting from the location of the user, or may detect, as the target device 11, the device 11 located at the point of gaze of both eyes of the user. The detection unit 131 may supply the device specific information of the detected target device 11 to the acquisition unit 132.

It should be noted that the database may be provided in the watching terminal 13, or may be externally connected to the watching terminal 13. In addition, the detection unit 131 may further have a distance measuring sensor that measures a distance from the watching terminal 13 to an object in front (the device 11 as an example). In this case, the detection unit 131 may further use a signal from the distance measuring sensor to detect the point of gaze of the user.

In addition, the detection unit 131 may have a camera for capturing an image of an eyeball of the user. In this case, the detection unit 131 may specify a distance from the watching terminal 13 to the point of gaze of the user by using a convergence angle which is calculated from orientations of left and right eyeballs. When the detection unit 131 is provided with the camera for capturing the image of the eyeball, the detection unit 131 may detect the line of sight by analyzing the image of the eyeball without using the six axis sensor.

2.3. Acquisition Unit 132

The acquisition unit 132 is configured to acquire, from the storage address associated with the target device 11, the measurement data related to the target device 11. The acquisition unit 132 may further acquire, from the storage address associated with the target device 11, the value of the configuration parameter of the target device 11. The acquisition unit 132 may further acquire the relationship diagram from the storage address of the relationship diagram associated with the target device 11. The acquisition unit 132 may supply the acquired measurement data or the like to the display unit 133.

The acquisition unit 132 may detect one or more storage addresses associated with the device specific information of the target device 11 with reference to the storage unit 130. The acquisition unit 132 may acquire the measurement data, the value of the configuration parameter, or the relationship diagram by the wireless communication from the internal storage device of the target device 11 corresponding to the storage address, or the external storage device (in the present embodiment, as an example, the operation control apparatus 15, the interface apparatus 16, the resource management apparatus 17, the maintenance and management apparatus 19, the maintenance terminal 12, or the like).

The acquisition unit 132 may indirectly access the target device 11 corresponding to the storage address, or the external storage device of the target device 11 via a communication device or the like. For example, by wirelessly communicating with the wireless communication device 14 externally connected to the target device 11, or the wireless communication device 14 externally connected to the external storage device of the target device 11, the acquisition unit 132 may indirectly access the target device 11, or the external storage device of the target device 11 via the wireless communication device 14.

In this case, the acquisition unit 132 may acquire the measurement data from two or more storage devices (in the present embodiment, as an example, the internal storage device of the device 11, or the external storage device of the device 11) via one wireless communication device 14. As an example, the acquisition unit 132 may acquire the plurality of types of measurement data related to one target device 11 from two or more storage devices via one wireless communication device 14, or may acquire the plurality of pieces of measurement data of the same type or different types in relation to the plurality of target devices 11.

In addition, by wirelessly communicating with a communication unit built in the target device 11, or a communication unit built in the external storage device of the target device 11, the acquisition unit 132 may directly access the target device 11, or the external storage device of the target device 11. As an example, when the storage address associated with the target device 11 is not an address which is able to be accessed from the wireless communication device 14, the acquisition unit 132 may directly access the target device 11 corresponding to the storage address, or the external storage device of the target device 11. As an example, in this case, the acquisition unit 132 may perform the wireless communication in accordance with the standard of the Bluetooth (registered trademark). It should be noted that when the acquisition unit 132 and the external storage device of the target device 11 directly communicate wirelessly, the storage device may be arranged at the field site where the process is executed in the plant.

2.4. Display Unit 133

The display unit 133 is configured to display a content acquired by the acquisition unit 132. For example, the display unit 133 may display the measurement data acquired by the acquisition unit 132. In addition, the display unit 133 may display the value of the configuration parameter of the target device 11, or the relationship diagram.

With the above-mentioned watching terminal 13, when the target device 11 that is looked at by the user is detected among the plurality of devices 11 existing in the plant, the measurement data related to the target device 11 is acquired from the storage address associated with the target device 11, and is displayed. Accordingly, it is possible to check the measurement data related to the device 11 only by looking at the device 11 in the plant.

In addition, the storage addresses of the plurality of types of measurement data are respectively stored in association with each of at least some devices 11 among the plurality of devices 11, and thus when the target device 11 looked at by the user is detected, the plurality of types of measurement data related to the target device 11 are acquired from the storage addresses and displayed. Accordingly, it is possible to check each of the plurality of types of measurement data related to the device 11 only by looking at the device 11.

In addition, the measurement data related to at least some devices 11 among the plurality of devices 11 is stored in the external storage device of the at least some devices 11, and the address which is in the storage device is stored in association with each of the at least some devices 11 as the storage address of the measurement data. Accordingly, when the measurement data related to the device 11 is stored outside the device 11, it is possible to check the measurement data related to the device 11 only by the user looking at the device 11.

In addition, the measurement data related to at least some other devices 11 among the plurality of devices 11 is stored in the internal storage device of each of the at least some other devices 11, and the address which is in the storage device is stored, in association with each of the at least some other devices 11, as the storage address of the measurement data. Accordingly, when the measurement data related to the device 11 is stored inside the device 11, it is possible to check the measurement data related to the device 11 only by the user looking at the device 11. Accordingly, when the measurement data related to the device 11 is stored either outside or inside the device 11, it is possible to check the measurement data related to the device 11 only by the looking at the device 11.

In addition, the measurement data related to the two or more devices 11 is stored in the single external storage device of the device 11, and the addresses which are in the storage device and different from each other are respectively stored in association with the two or more devices 11 as the storage address of the measurement data. Accordingly, the maintenance and management system 1 can be simplified as the storage devices for the measurement data can be aggregated.

In addition, the measurement data related to each of the two or more devices 11 is able to be acquired via one wireless communication device 14 provided outside the apparatus, and thus it is possible to save the trouble of individually establishing the wireless connection with each device 11.

In addition, the measurement data includes the measurement data obtained by the sensor as the device 11, and thus it is possible to acquire the measurement data obtained by the sensor only by looking at the sensor.

In addition, the measurement data includes the measurement data obtained by the sensor that is provided in the device 11, or the sensor that is provided in the accessory of the device 11, and thus it is possible to acquire, only by looking at the device 11, the measurement data obtained by the sensor that is provided in the device 11 or the accessory.

In addition, the measurement data includes the measurement data obtained by the sensor that is provided in the accessory on the upstream side or the downstream side with respect to the pipe as the device 11, and thus it is possible to acquire, only by looking at the pipe, the measurement data obtained by the sensor that is provided in the accessory on the upstream side or the downstream side.

In addition, the value of the configuration parameter of the target device 11 is further acquired and displayed, and thus it is possible to check, only by looking at the device 11, the measurement data related to the device 11 and the value of the configuration parameter.

In addition, the relationship diagram of the target device 11 is further acquired and displayed, and thus it is possible to check, only by looking at the device 11, the relationship diagram showing the relationship between the device 11 and the other device 11.

3. Appearance of Watching Terminal 13

Figure 3:
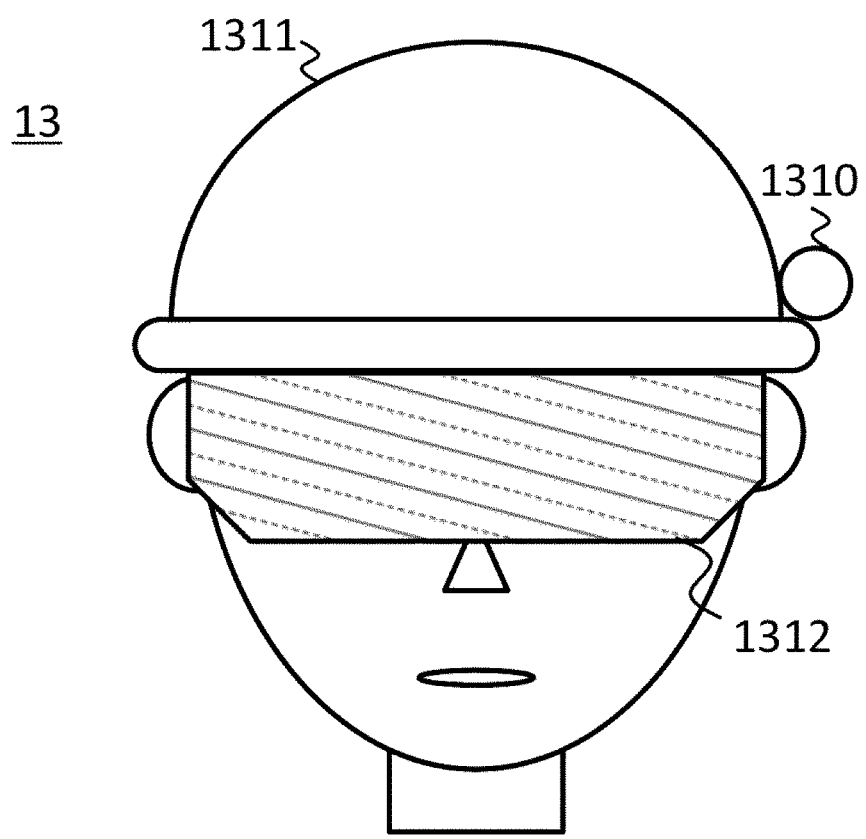
FIG. 3 shows an appearance of the watching terminal 13.

FIG. 3 shows an appearance of the watching terminal 13.

The watching terminal 13 may be a wearable computer worn by the user, and in the present embodiment, it is a so-called head-mounted display of a head-worn type as an example. The watching terminal 13 may have a helmet 1311 worn on the head of the user, goggles 1312 covering the eyes of the user, and one or more sensors 1310.

The helmet 1311 protects the head of the user. It should be noted that the helmet 1311 may not be provided on the watching terminal 13.

The goggles 1312 are provided on a front side portion of the watching terminal 13 and cover the eyes of the user. The goggles 1312 is an example of the display unit 133, and may be a display of an optical transmission type. The goggles 1312 may superimpose display contents and display the contents in a field of view of the user.

The sensor 1310 is provided on the front side portion of the watching terminal 13. In the present embodiment, as an example, the sensor 1310 is provided on the helmet 1311, but may be provided on the goggles 1312.

4. Operation of Watching Terminal 13

Figure 4:
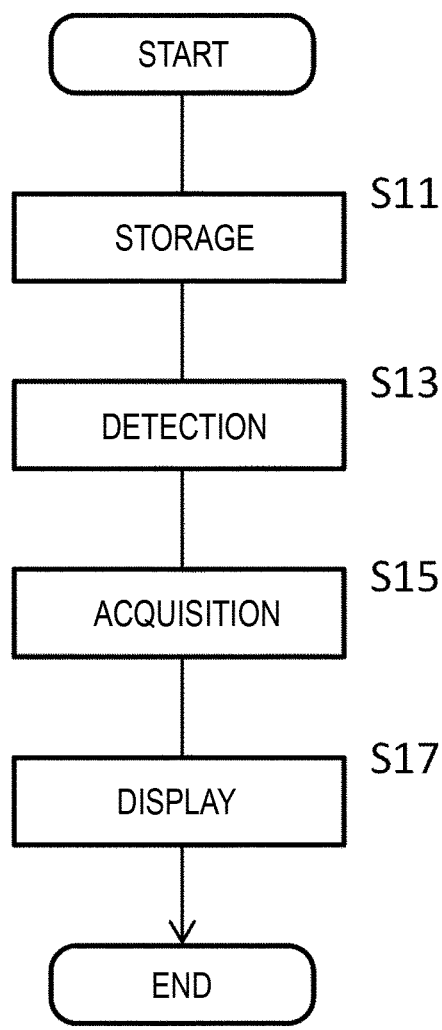
FIG. 4 shows an operation of the watching terminal 13.

FIG. 4 shows an operation of the watching terminal 13. The watching terminal 13 supports the maintenance and management of the plant by performing processing of step S11 to step S17.

In step S11, the storage unit 130 stores, in association with each of the plurality of devices 11 existing in the plant, the storage address of the measurement data which is related. The storage unit 130 may further store the storage address of the value of the configuration parameter or the relationship diagram in association with the device 11. In the present embodiment, as an example, a correspondence table between the device 11 and the storage address may be created by a plant manager to be stored in the storage unit 130.

It should be noted that the processing of step S11 may be performed each time the operation of the watching terminal 13 is started, or may be performed each time the operation of the watching terminal 13 is started with a reference interval (one month as an example). Instead of this, the processing of step S11 may be performed only at a first operation of the watching terminal 13, and may not be performed at a second and subsequent operations.

In step S13, the detection unit 131 detects the target device 11 that the user is looking at among the plurality of devices 11 existing in the plant. The detection unit 131 may detect the target device 11 by detecting the location and the line of sight of the user in the plant and referring to a database (not shown) in which the location coordinates of each device 11 in the plant are registered in advance. The detection unit 131 may detect the single device 11 as the target device 11, or may detect each of the plurality of devices 11 as the target device 11.

In step S15, the acquisition unit 132 acquires, from the storage address associated with the target device 11, the measurement data related to the target device 11. The acquisition unit 132 may further acquire the value of the configuration parameter of the target device 11 or the relationship diagram from the storage address. When there are the plurality of target devices 11, the acquisition unit 132 may acquire the measurement data or the like from the storage address for each target device 11.

In step S17, the display unit 133 displays the acquired content. When there are the plurality of target devices 11, the display unit 133 may display the measurement data or the like for each target device 11. As an example, the display unit 133 may display the measurement data or the like in association with each target device 11 by means of a balloon or a leader line.

5. Modification Example

It should be noted that in the embodiment described above, the goggles 1312 have been described as the display of the optical transmission type; however, the goggles 1312 may be a display of a video transmission type. In this case, the goggles 1312 may have an image capturing unit that captures an image in front of the user, and display the image captured by the image capturing unit on an inner side surface of the goggles 1312. In addition, the detection unit 131 may specify the line of sight of the user by using the image capturing unit. As an example, the detection unit 131 may detect, as the line of sight of the user, a straight line connecting a center of the goggles 1312, and a center of a field of view obtained by the image capturing unit.

In addition, when the watching terminal 13 is provided with the image capturing unit that captures the image in front of the user, the detection unit 131 may detect, as the target device 11, the device existing in the captured image by the image capturing unit. For example, the detection unit 131 may detect the target device 11 by referring to a database in which the captured image is registered in advance for each device in the plant, and collating, with the database, an appearance of the device 11 which is acquired by performing image processing such as edge extraction processing on the captured image. Instead of this, the detection unit 131 may detect the target device 11 by a unique code being provided on an outer surface of each device 11, and the code, which is detected in the captured image, being analyzed. The code may be a bar code, a two dimensional code (as an example, a QR code (registered trademark)), or the like, and may be provided in the device 11 by at least one of affixing, printing, or engraving.

In addition, the acquisition unit 132 has been described to acquire the measurement data related to the target device 11, the value of the configuration parameter, or the relationship diagram, but may further acquire the document stored in the document database 18. In this case, the storage unit 130 may store, as the storage address of the document, the address which is in the document database 18 in association with at least one device 11.

In addition, the acquisition unit 132 has been described to acquire the measurement data, the value of the configuration parameter, the relationship diagram, or the like, by the wireless communication, but may acquire at least some of these by the wired communication.

In addition, the watching terminal 13 has been described to be arranged at the field site where the process is executed in the plant; however, as long as the detection unit 131 and the display unit 133 are arranged at the field site, at least one of the storage unit 130 and the acquisition unit 132 may be arranged in the management room or the instrument room of the plant, or may be arranged outside the plant.

In addition, the apparatus has been described as the watching terminal 13, but may be set as the maintenance terminal 12, or may be set as another stationary apparatus. In these cases, the detection unit 131 may be a wearable device that is separated from the storage unit 130, the acquisition unit 132, the display unit 133, or the like of the apparatus, and is worn by the user. In addition, the detection unit 131 may detect the line of sight or the point of gaze of the user by using a camera that captures the eyeball of the user without being worn by the user.

In addition, various embodiments of the present invention may be described with reference to flowcharts and block diagrams whose blocks may represent (1) steps of processes in which operations are executed or (2) sections of apparatuses responsible for executing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored in the tangible device comprises an article of manufacture including instructions which can be executed to create means for executing operations specified in the flowcharts or block diagrams. Examples of the computer-readable medium may include an electronic storage medium, a magnetic storage medium, an optical storage medium, an electromagnetic storage medium, a semiconductor storage medium, etc. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

The computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++ or the like, and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for executing operations specified in the flowcharts or block diagrams. Examples of the processor include a computer processor, a processing unit, a microprocessor, a digital signal processor, a controller, a microcontroller, and the like.

Figure 5:
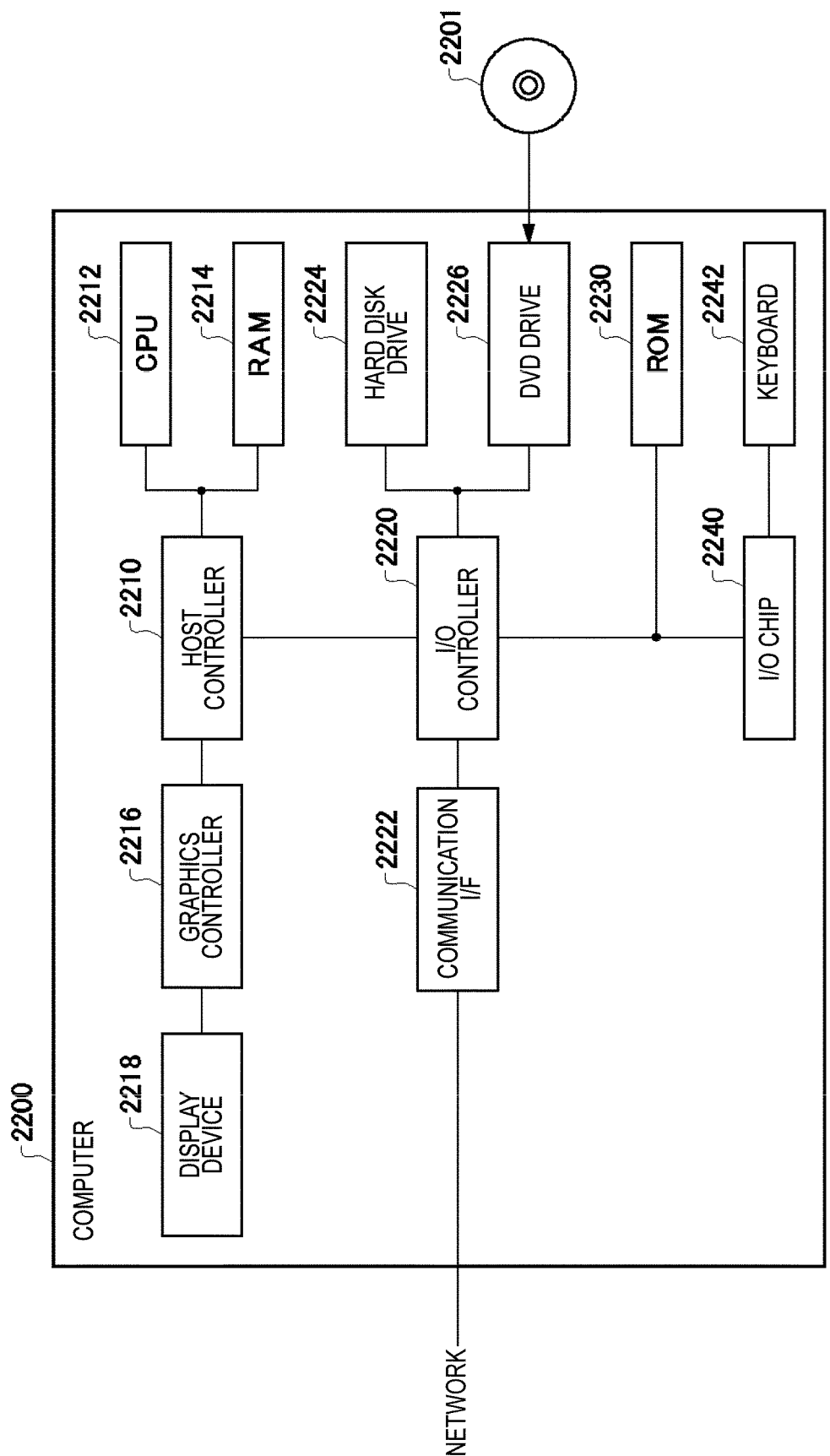
FIG. 5 shows an example of a computer 2200 in which a plurality of aspects of the present invention may be entirely or partially embodied.

FIG. 5 shows an example of a computer 2200 in which a plurality of aspects of the present invention may be entirely or partially embodied. A program that is installed in the computer 2200 can cause the computer 2200 to function as operations associated with apparatuses according to the embodiments of the present invention or one or more sections of the apparatuses, or can cause the computer 2200 to execute the operations or the one or more sections thereof, and/or can cause the computer 2200 to execute processes according to the embodiments of the present invention or steps of the processes. Such a program may be executed by a CPU 2212 to cause a computer 2200 to execute certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the graphics controller 2216 itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the programs and the data from the IC card, and/or writes the programs and the data to the IC card.

The ROM 2230 stores therein a boot program or the like executed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port, and the like.

A program is provided by the computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and execute various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on the computer 2200 or near the computer 2200. In addition, a recording medium such as a hard disk or a RAM provided in a server system connected to a dedicated communication network or the Internet can be used as a computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

According to this specification, each of the following aspects is also disclosed.

A first aspect provides an apparatus. The apparatus may include a storage unit configured to store, in association with each of a plurality of devices existing in a plant, a storage address of measurement data which is related. The apparatus may include a detection unit configured to detect, among the plurality of devices, a target device that a user is looking at. The apparatus may include an acquisition unit configured to acquire, from the storage address associated with the target device, measurement data related to the target device. The apparatus may include a display unit configured to display a content acquired by the acquisition unit.

The storage unit may be configured to respectively store, in association with each of at least one device among the plurality of devices, storage addresses of a plurality of types of measurement data.

Measurement data related to at least some devices among the plurality of devices may be stored in an external storage device of the at least some devices. The storage unit may be configured to store an address, which is in the storage device, in association with each of the at least some devices.

Measurement data related to two or more devices among the at least some devices may be stored in a single external storage device of the two or more devices. The storage unit may be configured to store addresses, which are in the storage device and different from each other, in association with each of the two or more devices.

Measurement data related to at least some other devices, which are different from the at least some devices, among the plurality of devices may be stored in an internal storage device of each of the at least some other devices. The storage unit may be configured to store, in association with each of the at least some other devices, an address which is in the internal storage device of the each of the at least some other devices.

The acquisition unit may be configured to acquire measurement data from two or more storage devices via one wireless communication device provided outside the apparatus.

A plurality of pieces of the measurement data related to the plurality of devices may include measurement data obtained by a sensor that is provided in a device, or a sensor that is provided in an accessory of the device.

A plurality of pieces of the measurement data related to the plurality of devices may include measurement data obtained by a sensor as a device.

A plurality of pieces of the measurement data related to the plurality of devices may include measurement data obtained by a sensor which is provided in an accessory of an upstream side or a downstream side with respect to a pipe as a device.

In one or more devices among the plurality of devices, a value of at least one parameter may be able to be set. The storage unit may be further configured to store, in association with each of the one or more devices, a storage address of a value of a parameter of the each of the one or more devices. The acquisition unit may be further configured to acquire, from a storage address of a value of a parameter associated with the target device, the value of the parameter of the target device.

The storage unit may be further configured to store a storage address of a relationship diagram showing, for each device existing in the plant, a relationship between the device and another device. The acquisition unit may be further configured to acquire the relationship diagram from the storage address of the relationship diagram associated with the target device.

A second aspect provides a system. The system may include the apparatus according to the first aspect. The system may include at least one storage device configured to store, in association with each of at least some devices among the plurality of devices, measurement data related to the each of the at least some devices.

A third aspect provides a method. The method may include storing, in association with each of a plurality of devices existing in a plant, a storage address of measurement data which is related. The method may include detecting, among the plurality of devices, a target device that a user is looking at. The method may include acquiring, from the storage address associated with the target device, measurement data related to the target device. The method may include displaying a content acquired by the acquiring.

A fourth aspect provides a computer-readable medium having recorded thereon a program. The program may cause a computer to function as a storage unit configured to store, in association with each of a plurality of devices existing in a plant, a storage address of measurement data which is related. The program may cause the computer to function as a detection unit configured to detect, among the plurality of devices, a target device that a user is looking at. The program may cause the computer to function as an acquisition unit configured to acquire, from the storage address associated with the target device, measurement data related to the target device. The program may cause the computer to function as a display unit configured to display a content acquired by the acquisition unit.

EXPLANATION OF REFERENCES 1 maintenance and management system
11 device
12 maintenance terminal
13 watching terminal
14 wireless communication device
15 operation control apparatus
16 interface apparatus
17 resource management apparatus
18 document database
19 maintenance and management apparatus
100 control network
101 network
130 storage unit
131 detection unit
132 acquisition unit
133 display unit
1310 sensor
1311 helmet
1312 goggles
1900 device ledger
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. An apparatus comprising:
at least one processor;
a storage unit that uses the at least one processor to store a storage address of measurement data which is related to each of a plurality of devices existing in a plant:
a detection unit that uses the at least one processor to detect, among the plurality of devices, a target device that a user is looking at;
an acquisition unit that uses the at least one processor to acquire, from the storage address associated with the target device, the measurement data related to the target device; and
a display unit that uses the at least one processor to display a content acquired by the acquisition unit;
wherein
the detection unit uses the at least one processor to detect the target device by detecting a location and a line of sight of the user in the plant;

the acquisition unit uses the at least one processor to acquire the measurement data related to the target device disposed at each of a plurality of field sites where a process is executed in the plant in response to the user looking at the target device; and the storage unit uses the at least one processor to store the storage address each time an operation of the apparatus is started or each time an operation of the apparatus is started within a reference interval.

2. The apparatus according to claim 1, wherein
the storage unit uses the at least one processor to respectively store, in association with each of at least one device among the plurality of devices, storage addresses of a plurality of types of measurement data.

3. The apparatus according to claim 2, wherein
measurement data related to at least some devices among the plurality of devices is stored in an external storage device of the at least some devices, and
the storage unit uses the at least one processor to store an address, which is in the storage device, in association with each of the at least some devices.

4. The apparatus according to claim 2, wherein
a plurality of pieces of the measurement data related to the plurality of devices include measurement data obtained by a sensor that is provided in a device, or a sensor that is provided in an accessory of the device.

5. The apparatus according to claim 2, wherein
a plurality of pieces of the measurement data related to the plurality of devices include measurement data obtained by a sensor as a device.

6. The apparatus according to claim 2, wherein
a plurality of pieces of the measurement data related to the plurality of devices include measurement data obtained by a sensor which is provided in an accessory on an upstream side or a downstream side with respect to a pipe as a device.

7. The apparatus according to claim 1, wherein
measurement data related to at least some devices among the plurality of devices is stored in an external storage device of the at least some devices, and
the storage unit uses the at least one processor to store an address, which is in the storage device, in association with each of the at least some devices.

8. The apparatus according to claim 7, wherein
measurement data related to two or more devices among the at least some devices is stored in a single external storage device of the two or more devices, and
the storage unit uses the at least one processor to store addresses, which are in the storage device and different from each other, in association with each of the two or more devices.

9. The apparatus according to claim 8, wherein
measurement data related to at least some other devices, which are different from the at least some devices, among the plurality of devices is stored in an internal storage device of each of the at least some other devices, and
the storage unit uses the at least one processor to store, in association with each of the at least some other devices, an address which is in the internal storage device of the each of the at least some other devices.

10. The apparatus according to claim 8, wherein
the acquisition unit uses the at least one processor to acquire measurement data from two or more storage devices via one wireless communication device provided outside the apparatus.

11. The apparatus according to claim 7, wherein
measurement data related to at least some other devices, which are different from the at least some devices, among the plurality of devices is stored in an internal storage device of each of the at least some other devices, and
the storage unit uses the at least one processor to store, in association with each of the at least some other devices, an address which is in the internal storage device of the each of the at least some other devices.

12. The apparatus according to claim 7, wherein
the acquisition unit uses the at least one processor to acquire measurement data from two or more storage devices via one wireless communication device provided outside the apparatus.

13. The apparatus according to claim 1, wherein
a plurality of pieces of the measurement data related to the plurality of devices include measurement data obtained by a sensor that is provided in a device, or a sensor that is provided in an accessory of the device.

14. The apparatus according to claim 1, wherein
a plurality of pieces of the measurement data related to the plurality of devices include measurement data obtained by a sensor as a device.

15. The apparatus according to claim 1, wherein
a plurality of pieces of the measurement data related to the plurality of devices include measurement data obtained by a sensor which is provided in an accessory on an upstream side or a downstream side with respect to a pipe as a device.

16. The apparatus according to claim 1, wherein
in one or more devices among the plurality of devices, a value of at least one parameter can be set,
the storage unit further uses the at least one processor to store, in association with each of the one or more devices, a storage address of a value of a parameter of the each of the one or more devices, and
the acquisition unit further uses the at least one processor to acquire, from a storage address of a value of a parameter associated with the target device, the value of the parameter of the target device.

17. The apparatus according to claim 1, wherein
the storage unit further uses the at least one processor to store a storage address of a relationship diagram showing, for each device existing in the plant, a relationship between the device and another device, and
the acquisition unit further uses the at least one processor to acquire the relationship diagram from the storage address of the relationship diagram associated with the target device.

18. A system comprising:
the apparatus according to claim 1; and
at least one storage device that uses the at least one processor to store, in association with each of at least some devices among the plurality of devices, measurement data related to the each of the at least some devices.

19. A method comprising:
storing a storage address of measurement data which is related to each of a plurality of devices existing in a plant;
detecting, among the plurality of devices, a target device that a user is looking at;
acquiring, from the storage address associated with the target device, the measurement data related to the target device; and
displaying a content acquired by the acquiring;

wherein the detecting includes detecting the target device by detecting a location and a line of sight of the user in the plant;

the acquiring includes acquiring the measurement data related to the target device disposed at each of a plurality of field sites where a process is executed in the plant in response to the user looking at the target device; and the storing includes storing the storage address each time an operation of anapparatus is started or each time an operation of an apparatus is started within a reference interval.

20. A non-transitory computer-readable medium having recorded thereon a program that causes a computer to function as:

a storage unit configured to store a storage address of measurement data which is related to each of a plurality of devices existing in a plant;

a detection unit configured to detect, among the plurality of devices, a target device that a user is looking at;

an acquisition unit configured to acquire, from the storage address associated with the target device, the measurement data related to the target device; and a display unit configured to display a content acquired by the acquisition unit;

wherein the detection unit uses the at least one processor to detect the target device by detecting a location and a line of sight of the user in the plant;

the acquisition unit uses the at least one processor to acquire the measurement data related to the target device disposed at each of a plurality of field sites where a process is executed in the plant in response to the user looking at the target device; and the storage unit uses the at least one processor to store the storage address each time an operation of an apparatus is started or each time an operation of an apparatus is started within a reference interval.

* * * * *